United States Patent [19]

Smith

[11] 4,122,031
[45] Oct. 24, 1978

[54] COMPLEX ALKALI METAL-METAL SILICATE MATERIAL

[75] Inventor: Fred Smith, Norwich, England

[73] Assignee: Anglian Water Authority, Huntingdon, England

[21] Appl. No.: 807,932

[22] Filed: Jun. 15, 1977

Related U.S. Application Data

[63] Continuation-in-part of Ser. No. 624,817, Oct. 22, 1975, abandoned.

[51] Int. Cl.² .............................................. B01J 13/00
[52] U.S. Cl. ................................ 252/313 S; 106/36; 252/131; 252/179; 252/317; 366/177; 366/196; 423/329; 423/330
[58] Field of Search ............... 252/313 S, 317, 179; 423/328, 329, 330; 259/4 R, 4 AC, 18, 19, 36, 37; 366/177, 196

[56] References Cited

U.S. PATENT DOCUMENTS

| | | | |
|---|---|---|---|
| 1,756,625 | 4/1930 | Behrman | 252/317 |
| 3,662,812 | 5/1972 | Godding | 259/18 X |
| 3,881,704 | 5/1975 | Smith | 259/95 X |
| 3,932,136 | 1/1976 | Stickney | 222/145 X |
| 3,963,640 | 6/1976 | Smith | 252/313 R |

FOREIGN PATENT DOCUMENTS

| | | | |
|---|---|---|---|
| 785,004 | 12/1972 | Belgium | 210/42 R |
| 1,399,598 | 7/1975 | United Kingdom | 210/42 R |

*Primary Examiner*—Richard D. Lovering
*Attorney, Agent, or Firm*—Lawrence Rosen; E. Janet Berry

[57] ABSTRACT

A complex alkali metal-metal-silicate material that is useful as a floc weighting agent is made by continuously bringing together concentrated solutions of alkali metal silicate and of a metal salt and substantially immediately mixing them in a vessel under high shear with a rotor. The product contains about 30% by weight of silicate, measured as $SiO_2$, and is insoluble in hydrochloric acid.

10 Claims, 2 Drawing Figures

COMPLEX ALKALI METAL-METAL SILICATE MATERIAL

This application is a continuation-in-part of my copending application Ser. No. 624,817 filed Oct. 22, 1975, now abandoned.

Very many processes have been described for forming sodium aluminum silicates and the corresponding potassium compounds, as well as the corresponding silicates in which aluminum is replaced by some other metal. A large number of such products are known. Some solid forms of products are well known and indeed many occur naturally. Commercially there is considerable interest in aqueous systems containing sodium aluminum silicates. Many of the known processes are only capable of giving dilute compositions of sodium aluminum silicate and this is satisfactory for purposes such as water purification where only small dosages are required. However there are many commercial applications where concentrated aluminum silicates would be desirable. Although various concentrates, and in fact various dried products, are known in general, the processes hitherto used for their production have generally been slow and laborious i.e., batch processes involving the slow stirring of viscous mixtures of sodium silicate and aluminum sulphate in water. The length of contact of the individual salts with the water before formation of the complex generally leads to wastage through precipitation, e.g., of aluminum sulphate. So far as I am aware, it has never previously been proposed to make such compositions on a continuous basis rapidly.

I have described in my U.S. Pat. No. 3,963,640, issued June 15, 1976, how a complex alkali metal-aluminosilicate material that is completely soluble in hydrochloric acid may be made by a process comprising mixing with high shear an aqueous solution of alkali metal silicate and an aqueous solution of an aluminum salt in such proportions and under such conditions that a complex alkali metal-aluminosilicate polymeric material is formed substantially immediately upon contact of the solutions and is rendered into a stable dispersion in water. In the preferred method of operating that process it is described that one feeds to a mixer in which the high shear is applied the sodium silicate and aluminum salt solutions and also quite a large volume of water and the final product has a silicate content, measured as $SiO_2$, of from 0.5 to 5%, and a pH value of from 3 to 7.5. In general the pH varies directly according to $SiO_2$ content, the pH being at the lower end of the range for low $SiO_2$ contents and being at the high end of the range, for example above 5.5, when the $SiO_2$ content is 5%.

My U.S. Pat. No. 3,963,640 gives no indication that any composition having a higher solids content than 5% by weight of silicate can be made continuously. Indeed products made by the process of that patent having a silicate content of higher than 5% but less than about 7.5% are unsatisfactory in commercial use. Further, the apparatus which is used, as described in more detail in my U.S. Pat. No. 3,881,704, is small and apparently most suitable for dilute systems. The particular process exemplified in my U.S. Pat. No. 3,963,640 therefore gives fairly dilute suspensions and is remarkably successful for water purification but is less satisfactory for other commercial uses. The product described and claimed in my U.S. Pat. No. 3,963,640 is useful for water purification because it is charged and has a lyophobic colloidal nature. Its appearance is that of a water, milky colloid. The product can apparently exist in a polymeric form and its charge gives it good coagulating properties, whereby solids can be remvoed from aqueous suspensions.

Surprisingly, I have now found that a very much more concentrated complex alkali metal-metal-silicate can be prepared on a continuous basis, but whose properties differ markedly from that of my U.S. Pat. No. 3,963,640. The concentrated product has a silicate content of about 30% by weight, has no polymeric or colloidal properties, and does not carry a charge. It therefore cannot act as a coagulating agent, but it has utility as a floc weighting agent. Finally, in complete contrast to the product of my U.S. Pat. No. 3,963,640, the concentrate prepared in this invention is wholly insoluble in hydrochloric acid. The process for preparation of the concentrate of this invention comprises continuously introducing, into separate inlets of a vessel, a concentrated aqueous solution of alkali metal silicate and a concentrated solution of a salt of a metal other than an alkali or alkaline earth metal, substantially immediately mixing the solutions in the vessel under high shear with a rotor having blades that rotate at a speed of at least 1,000 rpm, and continuously forcing the reaction system out of an outlet in the vessel, the proportions of alkali metal silicate, metal salt and water which are introduced into the vessel being such that the product which is forced out of the vessel has a pH of from 2 to 7.5 and contains at least 10% by weight of silicate, measured as $SiO_2$, and from 1 to 10 parts by weight of water per part by weight of silicate, measured as $SiO_2$.

Thus the process is a continuous and rapid process for making concentrated compositions of complex alkali metal-metal silicate and involves bringing the reactants together continuously and substantially immediately mixing them, and continuously forcing the resultant product out of the vessel. The apparatus used in the invention is small and compact and the process of the invention is completed quickly. Thus the invention is highly advantageous when compared to traditional processes for making such products and which involve the use of large bulky reaction vessels and prolonged reaction periods and which are generally batch processes.

In order to ensure that the product of the invention has the desired characteristics, it is important that the concentrations of the alkali metal silicate and metal salt solutions should not be such that the product which is forced out of the reaction vessel contains less than 10% by weight of silicate, measured as $SiO_2$. Usually these products have a silicate concentration of at least 15% and preferably at least 20%, measured as $SiO_2$. I have found that the process of the invention is in fact easily adaptable so that products of higher concentration, for example 25% or more of silicate, measured as $SiO_2$, can be prepared, and indeed it is possible to choose the reactants such that the desired product is directly prepared (in which the silicate concentration is about 30%, measured as $SiO_2$) without any excess water.

Whereas in the process described in my U.S. Pat. No. 3,693,640 it was normal to introduce large amounts of water with the other two reactants, it is preferred in the present invention to keep the amount of water introduced into the reaction to a minimum. Generally there will be no separate supply of water to the reaction system.

It will be appreciated, therefore, that the product of the invention can be prepared in its final form or as a dispersion or suspension in water if the product in the vessel contains less than about 30% silicate, e.g., if it is dispersed in from 1 to 10 parts by weight of water per part by weight of silicate. If the product contains excess water, the complex product may settle out on standing to give an aqueous supernatant layer. The product which is forced out of the reaction vessel preferably contains from one to 3 parts by weight of water per part by weight of silicate, measured as $SiO_2$.

Although the amount of water in the system which is forced out of the reaction vessel is low at all times, the product of the inventon may exist in suspension and thus give the impression of homogeneity. These more dilute compositions have a creamy consistency while the most concentrated compositions have the consistency of, for example, toothpaste. The amount of water in the product which is forced out of the reaction vessel will vary in direct proportion to the concentration of the reactants.

If the conditions used in the invention are such that the mixture which is forced out of the reaction vessel has a concentration of less than 30% by weight of silicate, measured as $SiO_2$, then this product may be forced or allowed to settle out into two phases. One is the product of the invention having a silicate concentration of about 30% by weight, and which has a certain amount of water held within its structure, and the other is water alone. This second phase is a supernatant and can be removed if necessary. Thus the product of this invention is a true precipitate and has no colloidal properties.

The product of the invention can be used in aqueous dispersion or suspension but usually all water which is not held within the product is removed to give a solid, generally in powder form. The size of the particles in the aqueous compositions and of the particles in the powder can be very fine, and this is an important advantage.

In order that the composition which is forced out of the reaction vessel has the highest possible concentration the alkali metal silicate solution will be as concentrated as possible. Commercially the most concentrated alkali metal silicate solutions readily available generally have a concentration of around 30% by weight, measured as $SiO_2$, and it is preferred to use such solutions. However, if desired, more dilute solutions can be used provided always that the dilution was not so great that the composition which is forced out of the reaction vessel has a concentration of less than 10% by weight, measured as $SiO_2$. In general the alkali metal silicate solution will always have a concentration greater than 20% by weight, measured as $SiO_2$. Normally sodium silicate is used but potassium silicate may be used in place of all or part of it.

The metal salt solution that is used in the invention will be chosen having regard to the metal that is desired in the final product. Normally this metal is aluminum in which event an aluminum slat, for example aluminum sulphate, is preferred. When using commercially available aluminum sulphate, which may contain a little free acid, we find that the optimum amount is that which gives the composition which is forced out of the reaction vessel a pH of from 2 to 7.5, more preferably from 2.5 to 6 and most preferably from 3.0 to 4.5, e.g., 3.5. Thus using commercially available aluminum sulphate and sodium silicate this is a convenient guide to the amount of aluminum sulphate that should be used.

The pH is a useful indication of the proportion of aluminum sulphate that should be used for a given quantity of alkali metal silicate and simple experimentation will show suitable mole ratios of aluminum or other metal salt to alkali metal silicate. Metals that can be used in place of aluminum can be selected from any metals other than alkali and alkaline earth metals and preferred examples are copper, iron, nickel, tin and zinc. The general requirement for the metal is that it should be capable of forming an aqueous salt solution and this solution may have an acidic pH. For example the salt may be the salt of a strong acid with a weak base, suitable acids being inorganic acids such as sulphuric acid, hydrochloric acid and nitric acid. Satisfactory final pH values for such solutions will be determined by experiment but are often from 2 to 7 and are generally from 2.5 to 5. However it does not seem to be essential to use an acidic salt solution and instead salts that give only slightly acidic, or even neutral or basic solutions may be used. It may then be desirable to add acid to reduce the pH to the preferred values indicated.

The products of the invention can be made by using aluminum salt or other metal salt solutions of a wide variety of concentrations but the molarity of the solution is normally fairly high, for example 0.1 to 5 molar, usually at least 0.3 molar and preferably above 0.7 molar, since otherwise the introduction of a sufficient amount of the metal necessarily involves the introduction of a rather large amount of water, and therefore an undesirable reduction in the concentration of the final composition.

As in known preparations of silicates, the product is generally washed and dried. The washing is preferably carried out with water, or with a solution of an ammonium salt if it is desired to give the product ion-exchange properties. If the complex silicate produced in the reaction vessel has a high or the maximum silicate concentration (i.e., about 30%) it may be desirable to disperse the complex in water before drying it. The washing and drying is preferably carried out on a continuous basis, e.g., in a drum using centrifugal or vacuum principles of filtration. In this way the cream or paste that is continuously produced in the invention retains its original consistency after the washing and drying operations.

Apparatus suitable for use in the process of the invention comprises a cylindrical mixing chamber having at one end two inlets and a rotor having a blade or blades for mixing material entering the chamber through the inlets under high shear, and an outlet at the other end of the chamber.

Conveniently the cylinder is an upright or inclined cylinder. Preferably the inlets are in the base of the cylinder and the outlet is at the top of the cylinder. Desirably the outlet is of substantially the same diameter as the cylinder so that the top of the latter merges into an outlet duct having substantially the same diameter as the base and which leads from the chamber to discharge, at a position remote from the chamber, product that overflows from the chamber. If the outlet is in the base of the chamber it is difficult to collect the reaction product as it is extruded.

It is essential to the invention that the mixing of the two solutions should be brought about with high shear and substantially immediately they are brought into contact, and this is achieved by positioning the rotor very close to the inlet end of the chamber. For example, the rotor may be from 0.5 to 50, and is preferably from 0.5 to 20 (e.g., 5) mm. from the inlet end of the chamber.

The rotor blade or blades preferably extend out from the axis of the chamber at least as far as the inlets and often further. For example the rotor blade or blades may have a diameter not less than ⅔ of the diameter of the chamber. The blade or baldes should rotate at at least 1,000 rpm, 1,700 rpm often being satisfactory. Optimum speed depends partly on chamber diameter and the speed may be 500, and preferably 1,000 rpm for each 25 mm. of chamber diameter. Thus, for instance, in a 100 mm. chamber, the blades may for example rotate at 2000 rpm and in such a chamber a suitable range of speeds is from 1,500 to 6,000 rpm. Normally the chamber is less than 200 mm. in diameter, and is usually from 50 to 150 mm. in diameter.

Preferably the rotor is designed such that it assists the upward flow of the reactants into the base of the chamber, and thereby causes the final product to be forced up through the chamber and out of the top of the chamber. Conveniently the motor that is necessary to rotate the rotor blades at high speed is mounted beneath the chamber and a drive shaft comes up through the base of the chamber between the two inlets which are preferably positioned on a diameter of the chamber, often at a distance of from ½ to ⅞ of the distance out from the center of the chamber.

The preferred means of providing the shear comprises a stator as well as a rotor. Normally the rotor is between the inlets and the stator. The rotor may have its blades set at from 10° to 20° from the horizontal while the stator may have its blades set at from 10° to 20° from the vertical. The rotor and the stator will normally have a very small clearance between them, for example 0.8 to 6 mm.

In general the shear required in the process of the present invention is normally at least as great and often slightly more than the shear required in the process of my U.S. Pat. No. 3,963,640.

The compositions prepared in the invention can generally be used in any situation where concentrated alkali metal-metal-silicates are desired and have been used previously. For example they may be used for purification of water, being added in small quantities to water supply, sewage or other aqueous suspensions from which material is to be separated by sedimentation but not by coagulation. The products do however have particular use in commercial applications such as in the paper industry and textile industry. For example, they may be used as fillers in the synthetic textile industry, e.g., as coatings for filaments and fibres to increase their friction in order to improve spinning and other operations, in the compression moulding industry and in the soap and detergent industry as, for example, a filler in the production of soap.

A suitable apparatus, and a suitable method of carrying out the process, will now be described with reference to the accompanying drawings, in which:

FIG. 1 is a cross-section of a suitable mixing apparatus while

Figure 1:
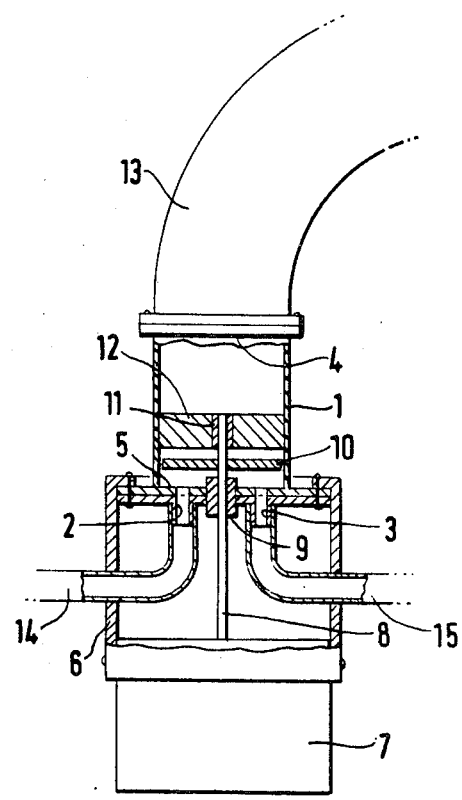
Figure 2:
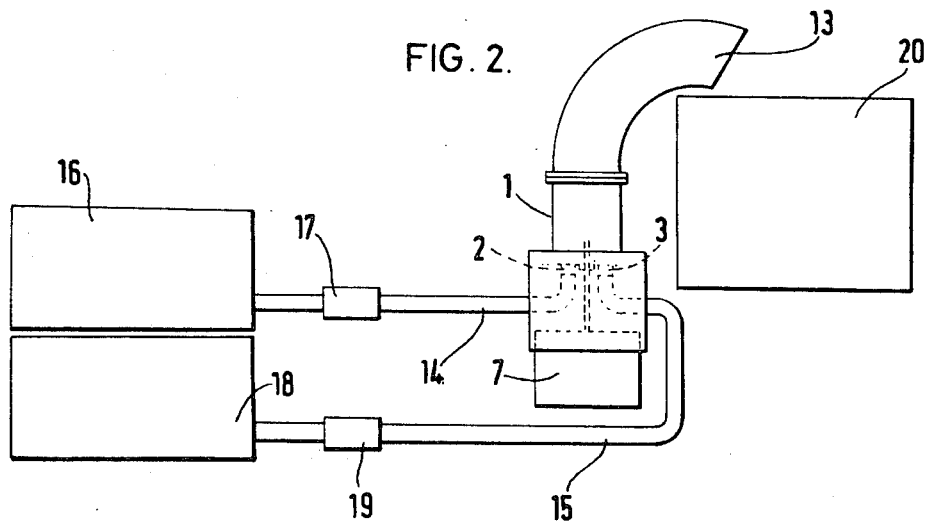
FIG. 2 is a flow diagram.

The mixing apparatus comprises a cylindrical mixing chamber 1 having inlets 2 and 3 and the open top 4 of the chamber serves as its outlet. The base of the chamber 5 is bolted into a frame assembly 6 in the base of which is bolted a motor 7. A drive shaft 8 extends from the motor up through the frame assembly and through a bush 9 in the base 5 of the chamber. Fixedly mounted on the shaft is a multiblade rotor 10 the blades of which are set at an angle of from 10° to 20° from the horizontal. The gap between the base 5 and the rotor 10 is very small.

The shaft continues beyond the rotor 10 and terminates in a bush 11 in a fixed multiblade stator 12 the blades of which are at an angle from 10° to 20° from the vertical.

Clamped to the top 4 of the chamber 1 is a sweep bend 13 that serves as an outlet duct from the top outlet 4. The sweep bend 13 leads to a collection tank 20. Ducting 14 leads to the inlet 2 and ducting 15 leads to the inlet 3. In a typical apparatus the height of the mixing chamber 1 may be, for example, 100 mm. and the internal diameter of the mixing chamber and of the duct 14 may be from 70 to 100mm. The motor may be designed to cause the rotor 10 to rotate at from 1,500 to 5,000 rpm. The gap between the base 5 and the rotor 10 and between the rotor 10 and the stator 12 may be, for example, 5 mm. There may be, for example, from 2 to 6 blades in each of the rotor and the stator.

In use the inclination of the blades and the speed of rotation will be chosen having regard to the concentrations of the liquids fed through the inlets such that not only is the desired instantaneous high shear applied but also so that the mixer acts as an ejector pump so that the product is continuously forced out of the mixing vessel.

EXAMPLES 1 TO 13

Various samples of the product of the invention were prepared from concentrated sodium silicate solution having a concentration of 30% measured as $SiO_2$. This is stored in the tank 16 and pumped through a pump 17 and ducting 14 to the inlet 2. At the same time a solution of aluminum sulphate having a concentration of 500 g/l. is pumped from storage tank 18 by proportionating pump 19 through the tubing 15 to the inlet 3. The relative rates of pumping by the pumps 17 and 19 is selected to give the mixture in the mixer 1 the necessary pH, equally successful results being achieved at pH values of from 5 to 6 and from 2.5 to 3.5.

The mixing chamber has a volume of 1 liter. The stator 12 comprises 6 blades fixed to the sides of the chamber at an angle of 10° to 20° from the vertical. The rotor 10 has six blades covering an area having a diameter of about 9.4 mm. The blades are at an angle of from 10° to 20° to the horizontal. The clearance between the stator and rotor blades is about 1.5 mm.

The rotor is rotated by the motor 7 at 1,500 rpm. The speed and design of the rotor and the stator is such that the resultant product has the consistency of a cream. Thirteen samples were produced in this way and subsequently washed with water, ammonium nitrate or ammonium carbonate and dried in a drum under vacuum. An analysis of each of the washed concentrate samples is given in the following Table. It will be seen that the product of Example 13 has a particularly advantageous pore volume value. In general this quantity is determined by the pH of the reaction mixture and by the concentrations of the reactants.

| | Analysis of washed Concentrate Samples | | | | | | | | |
|---|---|---|---|---|---|---|---|---|---|
| | Total Volatile | Dry Basis | | | | Surface Area | Pore Volume | | |
| | Matter | SiO$_2$ | Na$_2$O | Al$_2$O$_3$ | SiO$_2$:Al$_2$O$_3$ | (m$^2$/g. product) | (cm$^3$/g.) | % SO$_4$ = | Washing |
| 1 | 18.16 | 83.16 | 4.7 | 12.20 | 6.82 | 238 | 0.17 | Trace | Water |
| 2 | 17.71 | 81.47 | 5.08 | 11.58 | 7.04 | 234 | 0.13 | 0.06 | Water |
| 3 | 17.78 | 81.27 | 4.99 | 12.16 | 6.68 | 234 | 0.14 | Trace | Water |
| 4 | 25.48 | 83.87 | 5.64 | 12.01 | 6.85 | 243 | 0.17 | Trace | Water |
| 5 | 17.34 | 80.35 | 5.44 | 12.42 | 6.51 | 185 | 0.15 | Trace | Water |
| 6 | 18.47 | 81.24 | 4.91 | 12.16 | 6.68 | 255 | 0.18 | Trace | Water |
| 7 | 36.04 | 85.95 | 0.22 | 11.95 | 7.19 | 398 | 0.32 | 0.06 | NH$_4$NO$_3$ |
| 8 | 32.72 | 84.80 | 0.18 | 12.29 | 6.88 | 468 | 0.20 | Nil | NH$_4$NO$_3$ |
| 9 | 41.82 | 85.13 | 0.40 | 12.29 | 6.93 | 443 | 0.29 | 0.13 | NH$_4$NO$_3$ |
| 10 | 39.70 | 85.46 | 0.08 | 12.42 | 6.88 | 465 | 0.17 | 0.05 | NH$_4$NO$_3$ |
| 11 | 32.04 | 85.36 | 0.24 | 12.67 | 6.74 | 386 | 0.08 | 0.01 | NH$_4$NO$_3$ |
| 12 | 39.91 | 84.85 | 0.52 | 11.63 | 7.30 | 465 | 0.07 | 0.08 | NH$_4$NO$_3$ |
| 13 | 21.26 | 85.95 | 0.25 | 12.83 | 7.00 | 622 | 0.85 | Nil | (NH$_4$)$_2$CO$_3$ |

I claim:

1. A particulate, uncharged, complex alkali metal-metal silicate material which is insoluble in hydrochloric acid and in which the amount of silicate, measured as SiO$_2$, is about 30% by weight, when produced by a process comprising continuously introducing, into separate inlets of a vessel, a concentrated aqueous solution of alkali metal silicate and a concentrated aqueous solution of a salt of a metal other than an alkali or alkaline earth metal, substantially immediately mixing said concentrated solutions in said vessel under high shear with a rotor having blades that rotate at a speed of at least 1,000 rpm, and continuously forcing the reaction product out of an outlet in said vessel, by the action of the rotor blades the proportions of alkali metal silicate, metal salt and water which are introduced into said vessel being such that the product which is forced out of said vessel has a pH of from 2 to 7.5, contains said particulate complex alkali metal-metal-silicate material dispersed in from 0 to 10 parts by weight of water per part by weight of silicate, measured as SiO$_2$, and has a total silicate content of from 20 to about 30% by weight, measured as SiO$_2$.

2. The complex alkali metal-metal-silicate material of claim 1 in which the product which forced out of the vessel has a total silicate content of about 30% by weight, measured as SiO$_2$.

3. The complex alkali metal-metal-silicate material of claim 1 in which the product which is forced out of the vessel is dispersed in from 1 to 10 parts by weight of water per part by weight of silicate, measured as SiO$_2$.

4. The complex alkali metal-metal-silicate material of claim 3 in which the product which is forced out of the vessel is separated or allowed to separate into the complex alkali metal-metal-silicate having a silicate content of about 30% by weight and supernatant water, and removing the said supernatant water.

5. The complex alkali metal-metal-silicate material of claim 1 in which the alkali metal silicate is sodium silicate.

6. The complex alkali metal-metal-silicate material of claim 2 in which the metal salt is aluminum sulphate.

7. The complex alkali metal-metal-silicate material of claim 1 in which the process comprises introducing a concentrated aluminum sulphate solution and a concentrated sodium silicate solution separately through separate inlets arranged around the base of the vessel, which is cylindrical and in which there are, in the vessel, rotor blades that are at least two-thirds of the diameter of the vessel, rotate at 1,000 to 5,000 rpm, are mounted at 10° to 20° to the horizontal, are less than 0.5 to 5 mm. above the inlets, and are 0.8 to 6 mm. beneath stator blades that are mounted at 10° to 20° to the vertical.

8. The complex alkali metal-metal-silicate material of claim 1 when washed and dried.

9. The complex alkali metal-metal-silicate material of claim 1 in dry particulate form.

10. The complex alkali metal-metal-silicate material of claim 1 wherein both concentrated aqueous solutions flow upwardly through said vessel.

* * * * *